United States Patent
Wesch

[15] 3,663,264
[45] May 16, 1972

[54] PROCESS OF MANUFACTURING COATED REINFORCED CAST RESIN AND RESULTANT ARTICLE

[72] Inventor: Ludwig Wesch, Heidelberg, Germany
[73] Assignee: Mancar-Trust, Vaduz, Liechtenstein
[22] Filed: Jan. 9, 1970
[21] Appl. No.: 1,869

Related U.S. Application Data

[63] Continuation-in-part of Ser. No. 651,125, July 5, 1967, abandoned.

[52] U.S. Cl..................................117/68, 117/72, 117/94, 117/95, 117/126 GB, 117/126 GE, 117/138.8 F, 117/138.8 VA, 117/138.8 A, 117/161 UD, 117/161 UA, 138/145
[51] Int. Cl...................B32b 17/04, B32b 1/08, B44d 1/16
[58] Field of Search..........117/72, 126 GR, 126 GS, 126 GE, 117/94, 97, 138.8 A, 138.8 F, 138.8 U, 161 UD; 161/192, 193, 194, 195; 138/145

[56] References Cited

UNITED STATES PATENTS

| | | | |
|---|---|---|---|
| 2,952,576 | 9/1960 | Wheelock et al. | 117/126 GS X |
| 3,026,223 | 3/1962 | Vanderbilt et al. | 260/891 X |
| 3,278,333 | 10/1966 | Titzmann et al. | 117/138.8 F |
| 3,314,450 | 4/1967 | Doering et al. | 117/72 X |
| 3,419,511 | 12/1968 | Condo et al. | 117/138.8 UX |
| 3,447,572 | 6/1969 | Vanderbilt et al. | 161/195 X |

Primary Examiner—William D. Martin
Assistant Examiner—Ralph Husack
Attorney—Arthur O. Klein

[57] ABSTRACT

A reinforced cast resin formed from polyester, epoxide or butadiene-styrene resins and containing curing catalysts and accelerators for the cast resin are coated with a protective coating of a synthetic rubbery polymer selected from polybutadiene, polyacrylonitrile, polystyrene, butadiene-acrylonitrile copolymer, butadiene-styrene copolymer or mixtures thereof which contain curing agents and accelerators for the rubbery polymer. The curing catalysts and accelerators for the cast resin and the curing agents and accelerators for the rubbery polymer are different but selected such that they react and function within the same temperature range, and the cast resin is polymerized and cured simultaneously with the vulcanizing and curing of the synthetic rubbery polymer. The protective coating may be provided on both surfaces of the cast resin with each coating having an additional layer of polyvinyl chloride or polyethylene positioned between the protective coating and the cast resin.

14 Claims, No Drawings

PROCESS OF MANUFACTURING COATED REINFORCED CAST RESIN AND RESULTANT ARTICLE

This application is a continuation-in-part application of application Ser. No. 651,125, filed July 5, 1967 and titled, "Protective Coatings Based on Synthetic Rubbers For Reinforced Cast Resins," now abandoned.

This invention relates generally to a process for manufacture of novel protective coatings for cast resins, processes therefor and articles and surfaces having coated thereon the protective coatings and more particularly, to such protective coatings based on synthetic rubbers and rubbery polymers and copolymers, which are vulcanized or copolymerized. The cast resins involved are polyester, epoxide, or butadiene-styrene resins.

Reinforced resins, especially those such as the glass fiber reinforced polyester, epoxy, butadiene and styrene polymerizate-resins mixtures, show a tendency to pick up water or other liquids between the reinforcement materials and the resin. This water-takeup, which leads to a gradual degradation of the mechanical and high-frequency properties of cast resins, varies from resin to resin. Nevertheless, it has been found necessary to undertake to correct this difficulty for commercial uses. Attempts have been made to do this by using thin-walled fleece, on a base of polyamide thread, polyester thread, or similar substance in the coating of reinforced-cast resins. However, it was found that the fleece is easily damaged and, also, that the bond between the fleece and the resin is not always a good one.

It has also been attempted to employ synthetic rubber with polyvinyl chloride. Here, too, it was found that the bond to the resin was poor because of the fact that the catalysts of the resins were not compatible with the catalysts and accelerators for the types of resins involved that is, the synthetic rubber with polyvinyl chloride.

Thus and only by the use of the catalyst used to process rubber combinations, on one hand, combined with selection of such catalysts to be compatible with the catalysts and accelerators for the resins used, on the other hand, has it been found possible to employ synthetic rubber mixtures together with polyvinyl chloride and polyethylene. This is the essence of the herein described invention.

In addition, and as additional features of the invention, it has been found possible to add silane derivatives to the mixtures, for example, the silanes known as A172 or A 1100 from Union Carbide, so that, at the same time, a bond between the inorganic reinforcement agents used in the cast resin such as glass fibers, steel wool, and similar substances and the cast resins, was formed. These silanes, furthermore, provide a better bond for the fillers of the synthetic rubber mixtures. Thus the silanes serve as bonding agents between the organic and inorganic components. Also, satisfactory bonding results were obtained with the application of products containing isocyanate groups of 0.1–5 wt. percent in a synthetic rubber mixture. These products, especially Desmodur T T, but also Demodur R. and Demodur L all of which are commercial products from Bayer werke, Leverkusen, Germany, are first added to the fillers so that, by vigorous stirring with the fillers and, eventually, slight heating, the solvents are evaporated. As a result of the mixing into the synthetic rubber mixture, a totally unexpected advantage is obtained, in that only one part of the isocyanate group reacts with the synthetic rubber combination, resulting in some slight vulcanization, but up to 50 percent of the isocyanate groups remain unreacted. These remaining isocyanate groups react either directly with the OH groups of the cast resins or indirectly during the hardening process with the reactive OH groups then formed.

The products obtained by the process of the invention show surprising result in that the bond with the cast resins are superior and it can therefore be theorized that a chemical combination is produced through a welding method.

For instance, on checking the bursting pressure as described in Example 1 hereinbelow of a pipe with a protective coating made as described herein, using a polyester, fiber glass reinforced material, it was found that this bursting limit had increased from 100 atmospheres up to 200 atmospheres and that the protective coating could not be removed from the polyester combination even by heating at 100° C. The wall strength of the pipe, without protective coating was 2.65 mm; the glass content 60 percent; and the thickness of the protective coating was 0.5 mm. It is possible to establish the ratio of the required mixture for cast-resin coatings for many types taking into consideration variations required by the application purposes. The following combinations have shown to give especially good results:

1. a. Butadiene - Acrylonitrile
   b. Polyvinylchloride
   c. with Silane A 172 for polyester and butadiene-styrene polymerizate-resin mixtures
   d. with Silane A 1100 for epoxy resins
2. a. Butadiene - Acrylonitrile
   b. Butadiene - Styrene - Polymerisate mixtures with polyethylene powder mixed for butadiene-styrene-polymerizate-resin mixtures
   c. with Silane A 172

A combination of the basic mixtures under 1 and 2 above listed may also be employed for polyester and epoxy resins. Mixture 1 is especially useful in cases where water has an adverse effect, and Mixture 2 for cases where solvents have an adverse effect or where gases of all kinds including reactive ones are present.

By employing polymerisate mixtures based on butadiene-styrene (for example, A 500 a commercial product from ESSO), the polarity of the mixture is, at the same time, decreased and the protective coating acquires a more non-polar quality, which, especially against hot water, has an advantageous effect.

The silanes which are preferred are A-150 (vinyl-trimethoxy-silane), A-172 (vinyl-tris-(beta-methoxy-ethoxy) silane) A-1100 (gamma-amino-propyl-triethoxy-silane) and Y-2525 (vinyl-trimethoxy-silane). A more complete list of useful silanes employed is shown in Table 1.

The lowest working temperatures for the catalysts is 80° C. and the highest temperature is 140° C. The preferred temperature in each case depends on the catalyst employed.

The catalysts and accelerators which can be employed in this invention are generally listed in Table 2. These may be used in concentrations between 0.1 and 5 percent, preferably in amounts of 1 to 2 percent. For example, for a given mixture, there may be conveniently used 1.5 percent of a catalyst, and 1.5 percent of an accelerator.

Many of the components of the coatings and other materials useful for practice of the invention are referred to herein by their commercial names, their commercial sources and identifies them by their chemical names.

As an additional, and important part of the invention, the total compositions of the herein described protective coatings, both before and after curing are novel. Furthermore, these selected admixtures used with the selected accelerators and catalysts, and the triggering or activating temperatures of which, selected with due consideration of the polymerization temperature of the resins and to coincide or at least overlap therewith, constitute new and heretofore unknown concepts and are intended as a part of the invention hereof. It is to be noted in particular that the additives of polyvinyl chloride and polyethylene would generally not be added to such a mixture.

TABLE 1.—CHEMICAL COMPOSITIONS OF THE MONOMERS OF SILANE

| Product name | Nomenclature | Formula |
|---|---|---|
| A-151 | Vinyl-triethoxy-silane | $CH_2=CHSi(OC_2H_5)_3$ |
| A-153 | Phenyl-triethoxy-silane | $C_6H_5Si(OC_2H_5)_3$ |
| A-172 | Vinyl-tris-(beta-methoxy-ethoxy)silane | $CH_2=CHSi(OCH_2CH_2OCH_3)_3$ |
| A-174 | gamma-Methacryl-oxypropyl-trimethoxy-silane | $CH_2=C(CH_3)-C-O(CH_2)_3Si(OCH_3)_3C-C$ |
| A-186 | beta-(3,4-epoxy-cyclo-hexyl-ethyl-trimethoxy-silane | 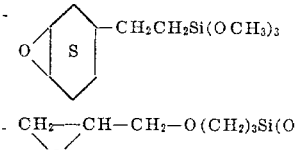 |
| A-187 | gamma-Glycidyl-oxypropyl-trimethoxy-silane | $CH_2-CH-CH_2-O(CH_2)_3Si(OCH_3)_3$ (with O bridge) |
| A-1100 | gamma-Amino-propyl-triethoxy-silane | $NH_2CH_2CH_2CH_2Si(OC_2H_5)_3$ |
| A-1120 | N-beta-(Amino-ethyl)-gamma-amino-propyl-trimethoxy-silane | $NH_2CH_2CH_2N(H)(CH_2)_3Si(OMe)_3$ |
| A-1911 | beta-Carbethoxy-ethyl-triethoxy-silane | $C_2H_5O\overset{O}{\overset{\|}{C}}CH_2CH_2Si(OC_2H_5)_3$ |
| Y-1575 | beta-Cyano-ethyl-triethoxy-silane | $NCCH_2CH_2Si(OC_2H_5)_3$ |
| Y-2525 | Vinyl-trimethoxy-silane | $CH_2=CHSi(OCH_3)_3$ |
| Y-2815 | Amyl-trimethoxy-silane | $C_5H_{11}Si(OCH_3)_3$ |
| Y-2967(a) | bis(beta-Hydroxy-ethyl-gamma-amino-propyl-triethoxy-silane | $(HOCH_2CH_2)_2N(CH_2)_3Si(OC_2H_5)_3$ |
| Y-4315 | gamma-Chloropropyl-trimethoxy-silane | $ClCH_2CH_2CH_2Si(OCH_3)_3$ |
| Y-4522 | beta-Mercapto-ethyl-trimethoxy-silane | $HSCH_2CH_2Si(OCH_3)_3$ |
| Y-5065 | Bi-cycloheptenyl-triethoxy-silane |  |
| Y-5107(b) | beta-(Chloro-methyl-phenyl)propyl-triethoxy-silane | $ClCH_2C_6H_4-\underset{\underset{CH_3}{\|}}{CH}-CH_2Si(OC_2H_5)_3$ |
| Y-5271 | gamma-Chloro-iso-butyl-triethoxy-silane | $ClCH_2CH-\underset{\underset{CH_3}{\|}}{CH_2Si(OC_2H_5)_3}$ |
| Y-5272 | beta-Cyclo-hexyl-ethyl-trimethoxy-silane | 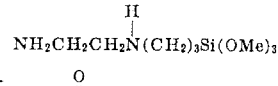 | a These materials represent 62% weight in ethanol.
b These materials are a combination of ortho and para-isomers.

TABLE 2.—CATALYSTS AND ACCELERATORS (0.1 TO 5%)

| Commercial name | Chemical name | Temperature of application, °C |
|---|---|---|
| A. Catalysts from Oxydo-Emmerich/Rhein: | | |
| Lucidol—Paste | Benzoylperoxyide, 50% in phthalate softener | 80 |
| Lucipal | Benzoylperoxyide, 20% with inert filler | 80 |
| Lucipal—Paste | Benzoylperoxyide, 20% in phthalate softener and inert filler | 80 |
| Cyclonox—Paste | Cyclohexanonperoxide, 50% in phthalate softener | 90 |
| Cyclonox—Paste B 25 | Cyclohexanonperoxide, 25% in phthalate softener and inert filler | 90 |
| Cyclonox—Liquid E 50 | Cyclohexanonperoxide, 50% in softener | 90 |
| Cyclonox—Liquid TM 50 | do | 90 |
| Cyclonox—G-20 | Cyclohexanonperoxide, 20% with inert filler | 90 |
| Butanox | 40% methylethylketonperoxide, 40% in dimethylphthalate | 90 |
| Butanox-L | Methylethylketonperoxide, 40% in dimethylphthalate | 90 |
| Iso-Butanox | do | 90 |
| Trigonox A 75 | tert. Butylhydroperoxide, 75% remainder di-tert. butylperoxide | 110 |
| Trigonox B | di-tert. Butylperoxide | 110 |
| Trigonox C | tert. Butylperbenxoate, 95% | 100 |
| Trigonox CM 50 | tert. Butylperbenxoate, 50% in dimethylphthalate | 100 |
| Trigonox DM 50 | 2,2-bis(tert. butylperoxy-) butane, 50% in dimethylphthalate | 100 |
| Trigonox FM 50 | tert. Butylperacetate, 50% in dimethylphthalate | 90 |
| Trigonox K 70 | Cumenehydroperoxide, 70% in alcohol, ketone, or cumene | 100 |
| Trigonox RM 25 | Diacetylperoxide, 25% in dimethylphthalate | 110 |
| Trigonox T | tert. Butylcumylperoxide, 95% | 110 |
| Trigonox TV 50 | tert. Butylcumylperoxide, 50% with inert filler | 110 |
| Trigonox 11 | Ketonperoxide, 50% in softener | 90 |
| Perkadox PFM 50 | tert. Butylpermaleinate, 50% in softener | 90 |
| Perkadox SB | Dicumyleroxide, 95% in softener | 110 |
| Perkadox BC 40 | Dicumyleroxide, 40% in calcium carbonate | 110 |
| Trigonox EM 50 | di-tert. Butyldiperphthalate, 50% in dimethylphthalate | 100 |
| Trigonox NT 50 | Paramethanhydroperoxide, 50% | 100 |
| Trigonox X 17 | Bifunctional peroxide | 90 |
| Trigonox X 27 | tert. Butylperester | 90 |

TABLE 2.—CATALYSTS AND ACCELERATORS (0.1 TO 5%)—Continued

| Commercial name | Chemical name | Temperature of application, °C. |
|---|---|---|
| Perkadox Y 12 | Polyfunctional peroxide, 40% in calcium carbonate | 110 |
| Perkadox Y 440 | Bifunctional peroxide | 110 |
| B. Accelerators from Oxydo-Emmerich/Rhein: | | |
| (a) Cobalt accelerators: | | |
| Accelerator 49 | Cobaltoctoate solution in dioctylphthalate (1% cobalt) | |
| Accelerator 50 | Cobaltoctoate solution in styrene (1% cobalt) | |
| Cobalt accelerator concentrate | Cobaltoctoate (10% cobalt) | |
| (b) Accelerators based on tertiary amines: | | |
| Accelerator 6310 | Dimethylaniline, 10% in dimethylphthalate | |
| Accelerator 6410 | Diethylaniline, 10% in dimethylphthalate | |
| Accelerator 6510 | Dimethylparatoluidine, 10% in dimethylphthalate | |
| (c) Vanadium accelerators: | | |
| Accelerator Q 2d | Vanadium-accelerator | |
| C. Accelerators from Bayer-Leverkusen: | | |
| (d) Guanidine accelerators: | | |
| Vulkacit 1000/C | o-Tolylbiguanidine | |
| (e) Mercapto accelerators: | | |
| Vulkacit DM | Dibenzothiazyldisulfide | |
| (f) Thiuram accelerators: | | |
| Vulkacit thiuram | Tetramethylthiuramdisulfide | |
| Vulkacit thiuram MS | Tetramethylthiuram monosulfide | |

TABLE 3.—SUBSTANCES EMPLOYED FOR COATINGS

| Commercial name | Composition | Chemical name |
|---|---|---|
| A 172 | Union Carbide USA | Vinyl-tris-(beta-methoxy-ethoxy)-silane. |
| A 1100 | do | Gamma-amino-propyl-triethoxy-silane. |
| Desmodur TT | Bayer-Leverkusen | Dimerized 2,4-toluylendiisocyanate. |
| Desmodur R | do | 20% solution of triphenylmethantriisocyanate in methylenchloride. |
| Desmodur L | do | Triphenylisocyanate. |
| A 500 | Esso | Mixed polymerisate of butadiene-styrene. |
| Perbunan N/V C70 | Bayer-Leverkusen | Stabilized, gel fraction of approx. 70 parts Perbunan N 2807 NS—consisting of 28% acrylonitrile and 72% butadiene with approx. 30 parts polyvinyl chloride. |
| Perbunan | do | Mixed polymerisate of about 28% acrylonitrile with about 72% butadiene. |
| Russ-Durex O | do | Acetylene black. |
| Vulkasil S | do | Specially pure, precipitated silicic acid about 88% $SiO_2$— |
| Albafixe | do | Precipitated barium sulfate. |
| Plastikator W 88 | do | Methylene bis-thioglycolic acid butylester. |
| Plastikator FH | do | Aromatic polyether. |
| Alterungsschutz DOD | do | 4,4'-dihydroxydiphenyl. |
| Alterungsschutz DDA | do | Diphenylamine derivative. |
| Zinkoxyd-Aktiv | do | Precipitated zinc oxide. |
| Vulkacit 1000/c | do | o-Tolylbiguanidine. |
| Vulkacit DM | do | Dibenzothiazyldisulfide. |
| Vulkacit Thiuram MS | do | Tetramethylthiurammonosulfide. |
| Vulkalent A | do | Diphenylnitrosamine. |
| Polyathylenpulver | Chem. Werke Huls | Polyethylene. |
| S 10 | Degussa | Polymethacrylate (low molecular weight). |
| S 20 | do | Polymethacrylate (high molecular weight). |

EXAMPLE 1

In the following Example 1 there is described a protective coating that may be used for all reinforced cast resin types including the three types (polyester, epoxide and butadiene-styrene) set forth particularly herein.

| Product | Amount, Parts |
|---|---|
| Perbunan N/V C 70 stabilized, gel fraction of approx. 70 parts Perbunan N2807NS, consisting of 28% acrylonitrile and 72% butadiene with approx. 30 parts polyvinyl chloride (containing polyvinylchloride) | 35 |
| Perbunan 2810 mixed polymerisate of about 28% acrylonitrile with about 72% butadiene | 12.50 |
| Russ Durex O acetylene black | 2.00 |
| Vulkasil S specially pure, precipitated silicic acid about 88% $SiO_2$ | 12.0 |
| Albafixe precipitated barium sulfate | 30.00 |
| Desmodur T T dimerized 2,4-toluylene diisocyanate | 0.6 |
| Desmodur R 20% solution of Triphenylmethantriisocyanate in methylenchloride | 1.00 |
| Plastikator W 88 methylene bis-thioglycolic acid butylester | 5.00 |
| Plastikator F H aromatic polyether | 7.00 |
| Stearic acid | 0.90 |
| Protection against aging DOD (Alterungsschutz) 4,4'-dihydroxydiphenyl | 0.40 |
| Protection against aging DDA (Alterungsschutz) diphenylamine derivative | 0.20 |
| ZnO Active | 0.75 |
| Sulfur | 0.20 |
| Vulkacit 1000/C-O-tolylquanidine | 0.20 |
| Vulkacit DM dibenzothiazyldisulfide | 0.20 |
| Vulkacit Thiuram MS tetramethylthiurammonosulfide | 0.40 |
| Vulkalent A diphenylnitrosamine | 0.15 |

The thickness of the protective coating produced by means of a calendering process should be approximately 0.5 mm. Roller temperatures for application of the coating are set approximately as follows:

| | |
|---|---|
| Upper Roller | 100°–110° C. |
| Medium Roller | 110°–115° C. |
| Lower Roller | 40° C. |

Application of the protective coating of this invention is made, for example, when pipes with fiber glass reinforcement are manufactured. The accelerators mentioned in Example 1 hereinabove are staged according to temperature, so that a very wide temperature plateau is formed as, for example, Vulkacit 1000/C-(o-tolylguanidine)-is still active under temperatures over 140° C. This is especially important when butadiene-styrene polymerisate-resin mixtures are used, since the catalysts and cross-linking agents have been set at these temperatures, and the protective coating, as well as the resin, have to react throughout and completely at the same temperatures if a total welding is to be accomplished. Vulkalent A (diphenylnitrosamine) constitutes a precaution against the devulcanization through its isocyanate groups, increasing the plasticization when the protective coating is further worked, for example, during pipe manufacture.

For polyester resins, types of catalysts should be employed as are commonly useful at temperatures up to 140° C., and which may, preferentially, cause initial reaction at 100° C. and a second reaction at 140° C. thus giving a double reaction, as for example, methylethylketoneperoxide and tert-butylhydroperoxide.

The chemicals mentioned in Example 1 are supplied commercially by Bayer Leverkusen and conform to the guidelines established by laws regulating food supplies so that the protective coating can be used for pipes carrying drinking water.

EXAMPLE 2

| Product | Amounts, Parts |
| --- | --- |
| Perbunan 2810 mixed polymerisate of about 28% acrylonitrile with about 72% butadiene | 30.0 |
| Butadiene-Styrene A 500 (ESSO) | 11.5 |
| Polyethylene powder, Huls | 5 |
| Russ Durex O acetylene black | 2.0 |
| Vulkasil S specially pure, precipitated silicic acid about 88% SiO$_2$ | 10.0 |
| Albafixe precipitated barium Sulfate | 28.8 |
| Desmodur R 20% solution of triphenylmethantriisocyanate in methylenchloride | 2.0 |
| Plastikator W 88 methylene-bis-thioglycolic acid butylester | 5.0 |
| Stearic Acid | 1.0 |
| Alterungsschutz DOD Protection Against Aging 4,4'-dihydroxydiphenyl | 0.6 |
| Active ZnO | 0.8 |
| Sulfur | 0.2 |
| Vulkacit 100/C-o-tolylbiquanidine | 0.4 |
| Vulkacit D M dibenzothiazyldisulfide | 2.0 |
| Vulkalent diphenylnitrosamine | 0.3 |
| A 172 vinyl-tris (beta-methoxy-ethoxy)-silane | 0.4 |

In the mixture of Example 2, there occurs a copolymerization between Perbunan (mixed polymerizate of about 28 percent acrylonitrile with about 72 percent butadiene) and A 500 (butadiene-styrene), as well as with the polyethylene. This protective coating has been found to be of advantage for all butadiene-styrene polymerisate mixtures, which can also be further processed with vinyl silane as an additional feature.

EXAMPLE 3

It is also possible to substitute the Perbunan 2810 up to 50 percent by Perbunan N/VC 70. By this procedure, polyvinylchloride is also introduced into the system. In some cases it has been found of advantage to employ also polymethacrylate up to 10 percent, preferably types S 10 or S 20 from Degussa, when polymethacrylate resins are employed exclusively for the manufacture of pipes, plates, or profiles. All mixtures of protective coating can, further, receive coatings of polyvinylchloride or polyethylene on either one side or both sides. These additional coating layers are processed with the same catalysts or activators as the protective coating itself, especially with those whose effectiveness (action) starts at temperatures over 130°. The layer should be a maximum 10 percent of the thickness of the protective coating. By this technique, it is possible to coordinate the elastic modulus of the reinforced resin components with that of the protective coating, thereby obtaining a very homogeneous combination of the individual components. In the vulcanization of the protective coating, a part of the peroxides and silanes becomes introduced into the layer so that the exterior layers of the protective coating are thus supersaturated with the material of the coating layer. This variation giving a transition between resin and protective coating is one of the preferred features of the invention. Polyethylene coatings are especially preferred for butadiene-styrene polymerisate-resins mixtures.

The choice of fillers plays an important role in the protective coating. The filler is responsible for both the pressure resistance (compressive strength) and the elastic modulus of the coatings. Its weight percentage should, if possible, be high. Silicone fillers have proved to be of value. They can be in part mixed with additional materials such as Albafixe, $TiO_2$, $Al_2O_3$ and the like. It is important that the silanes and isocyanates additives be worked into a dough at the same time as the filler so that a good combination results between the organic substances of the protective coating, the resins, and the inorganic fillers. The protective coating may contain 50 weight percent of same filler as that in resin.

The application of the protective coating is advisable for all types of pipes, internally as well as on the external surfaces thus increasing the life of the product to be protected. By use of these protective coatings it is no longer necessary to employ expensive resins, but cheaper resins may also be successfully employed. This is possible since the principal difficulty, the infiltration of water into the resins, is prevented and the protective coating takes up part of the compressive force. Through total bonding with resins, processed as herein described, (introduction into the upper layers of the resins) it has been possible to reduce substantially the cracking under dynamic pressure. This also substantially increases the life of the product, even under dynamic pressure.

In addition to manufacture of pipes and hollow items, these protective coatings may also be used for profiles and plates. Color effects can also be obtained by coloring the protective coating itself. In many cases, it will be necessary to apply the substances of the protective coating on items and surfaces having complicated forms. In such cases, by the application of dispersions, or lattices, it is possible to apply the protective coating on the items in the same form as when the coating is initially prepared in a calendar.

What is claimed is:

1. A process for manufacturing a reinforced cast resin having a protective coating on a surface thereof which comprises forming a cast resin having a reinforcing element embedded therein and selected from the group consisting of polyesters, epoxides, and butadiene-styrene resins and containing at least one curing catalyst and at least one accelerator for said cast resin, forming on a surface of said cast resin a protective coating of a synthetic rubbery polymer selected from the group consisting of polybutadiene, polyacrylonitrile polystyrene, butadiene-acrylonitrile copolymer, butadiene-styrene copolymer and mixtures thereof, and containing at least one curing agent, and at least one accelerator for said rubbery polymer, the curing catalysts and accelerators for said cast resin and the curing agents and accelerators for said rubbery polymer being different but selected such that they react and function within the same temperature range, and simultaneously polymerizing and curing said cast resin and vulcanizing and curing said synthetic rubbery polymer.

2. A process for manufacturing a fiber glass reinforced cast resin having a protective coating according to claim 1 wherein there is provided an additional layer selected from the group consisting of polyvinylchloride and polyethylene between the said protective coating and the said cast resin.

3. A process for manufacturing a reinforced cast resin having a protective coating according to claim 1, wherein there is provided a protective coating on both surfaces each coating having an additional layer selected from the group consisting of polyvinylchloride and polyethylene positioned between the said protective coating and the said cast resin.

4. A process for manufacturing a fiber glass reinforced cast resin having a protective coating according to claim 1 wherein the said protective coating contains at least 50 weight percent of the same filler as the reinforcement material of the cast resin.

5. A process for manufacturing a fiber glass reinforced cast resin having a protective coating according to claim 1 wherein the resin is a polyester resin.

6. A process for manufacturing a fiber glass reinforced cast resin having a protective coating according to claim 1 wherein the resin is an epoxide resin.

7. A process for manufacturing a fiber glass reinforced cast resin having a protective coating according to claim 1 wherein the resin is a butadiene-styrene resin.

8. A process according to claim 1 wherein products containing free isocyanate groups are added to the protective coating.

9. A process according to claim 1 wherein at least one silane containing substance is added to the protective coating.

10. An article formed by the process of claim 1.

11. The article of claim 10 which is a fiber glass reinforced cast resin pipe having a protective coating on at least one surface thereof.

12. The article formed by the process of claim 5.

13. The article formed by the process of claim 6.

14. The article formed by the process of claim 7.

* * * * *